United States Patent Office 3,142,773
Patented July 28, 1964

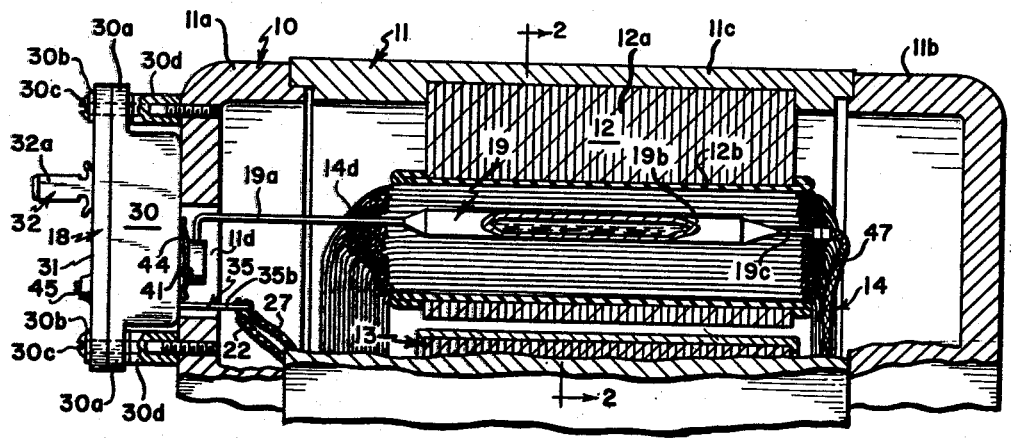

3,142,773
ELECTRIC MOTOR PROTECTION MEANS
Philip H. Snoberger, Pompano Beach, Fla., assignor to Ranco Incorporated, Columbus, Ohio, a corporation of Ohio
Filed Jan. 19, 1961, Ser. No. 83,681
3 Claims. (Cl. 310—68)

This invention relates to improvements in means for protecting electric motors against over-heating due to overloading during running, excessive currents in the windings resulting from a locked rotor condition, connection to power sources having voltages higher than the rated voltage of the motor, or the like.

Temperature increases in electric motors due to overloading of the motor during running are generally developed gradually since the increase in current flow in the windings is opposed by the back E.M.F. or bucking voltages induced therein by the running of the motor. On the other hand, during locked rotor conditions or upon connection to an excessive voltage source, for example, no back E.M.F. or insufficient back E.M.F. is present to oppose current flow, and a resultant heavy current flow is established almost instantaneously causing the motor temperature to rise so rapidly as to damage the windings in a matter of seconds. It is the practice to provide thermally responsive switches to open motor circuits and prevent damage to the motor windings; however, the size, configuration, construction, and manner of operation of thermally actuated protective elements, such as bimetal actuated switches and the like, has generally made them unsuitable to be responsive to the temperature conditions of the interior of the windings which is more subject to temperature increases than is the exterior of the windings. The protective elements have been mounted on the motor housing or in partial contact with the external windings and, because of the time lag experienced between an increase in winding current and the transfer of sufficient heat from the inner windings to the protective element to effect actuation thereof, it has been necessary to utilize motor current to provide auxiliary heating of the protective element in an attempt to provide thermal conditions at the protevtive element which duplicate the conditions at the interior of the windings.

In the case of electric motors in more or less confined housings, such as in refrigerators, air conditioners, and the like, the motor windings may be cooled to greater or lesser degrees by a medium flowing thereabout, and at times the windings may tend to be overheated because of a reduction in flow of the cooling medium. Obviously, the above mentioned forms of protective devices are relatively insensitive to the actual temperature of the interior of the windings under the condition described and do not afford adequate or proper protection for the motor.

Accordingly, it is a broad object of this invention to provide a more effective and reliable motor protection means including a motor control switch adapted to be actuated by the thermal expansion of fluid within an electrical current conducting tubular element which actually forms a turn of the windings carrying the motor current and is surrounded by, or in intimate contact with, the adjoining turns of the winding so as to be subjected both to substantially the same resistive electrical heating effects and the same heat transfer conditions as the adjoining winding turns.

It is a more specific object of the present invention to provide motor protection means of the above mentioned character, in combination with an electric motor having stator windings, at least one turn of which comprises a thermally responsive tubular element in the form of liquid filled metallic tubing having substantially the same current carrying characteristics as the wire turns of the windings so that temperature increases in the tubing due to the resistance to current flow, at least match the temperature increases of the wire due to current flow, and wherein the tubing is preferably wound into a winding slot in the winding supporting structure of the motor and is disposed beneath or buried by the other turns in that slot so as to be in intimate contact with the wire turns in the interior of the winding.

As another object of this invention the tubular element comprises a motor current carrying bulb portion buried in the running windings of a motor and having a small inside diameter to reduce the lag in temperature changes in the liquid therein, the bulb being connected at one end by a capillary tube of still smaller inside diameter which emerges from between the exterior windings and leads to an expansible switch operating means, preferably metal bellows, the relatively small size of the capillary tube reducing to a minimum the effects of external temperature changes on the movement of the bellows.

Other objects and advantages of this invention will be apparent from the following detailed description of a presently preferred embodiment thereof, and from the accompanying sheets of drawings forming a part of this specification, and in which FIG. 1 is a fragmentary view of an electric motor embodying the protection means of this invention with parts shown in section to better illustrate the construction thereof;

FIG. 2 is a fragmentary sectional view of a portion of the motor of FIG. 1;

FIG. 3 is a sectional view of the switch portion of this invention; and

FIG. 4 is a schematic diagram illustrating the connection of the protective means in the motor circuit.

Although the invention may be embodied in other types of electric motors and in motors used for other purposes, the invention is herein described with reference to induction motors such as may be used in refrigerators, washing machines, air conditioning units, and the like. Referring to the drawings, an electric motor is generally indicated at 10 and is shown embodying the temperature protection means of this invention. The motor includes a housing or frame 11 comprising end members 11a, 11b, and a central member 11c, within which are mounted a stator 12 and a rotor 13. The rotor 13 comprises an output shaft, not shown, and is suitably journaled in bearings formed in the end members 11a and 11b for rotation within the stator 12. The motor illustrated is of a conventional four pole, split-phase, induction type and the stator 12 comprises a laminated pole member 12a which provides the supporting structure for stator windings 14. The windings 14 are formed principally of wire wound in a conventional manner in slots 12b, formed in the laminated pole member 12a and have the usual insulation separating each loop or turn of the winding from the others. In this instance, there are running windings comprising two groups of two poles each, the groups being connected in parallel as illustrated in FIG. 4 and described hereinafter. One group comprises a north pole winding 14a and a south pole winding 14b, while the other group comprises a north pole winding 14c and a south pole winding 14d. A starting winding 16, of conventional split phase type, also forms a part of the stator winding.

Both the running windings 14 and the starting winding 16 are connected for energization through a normally closed thermostatically actuated protector switch generally indicated at 18. A thermostatic switch actuating element 19, in the form of a tubular member containing a liquid which expands and contracts with increases and decreases in temperature, is connected to switch 18 for actuation thereof and actually forms a part of the running windings 14 as will be more fully explained as the description proceeds. A circuit for one pair of windings, 14a and 14b, may be traced from a running winding terminal 20 through conductor 21, winding 14a, winding 14b, conductor 22, normally closed switch 18 and conductor 23 to a common terminal 24. A circuit for the other pair of running windings may be traced from running winding terminal 20 through conductor 25, winding 14c, winding 14d which includes tubular thermostatic element 19, protector switch 18, and common conductor 23 to common terminal 24. A circuit for the energization of starting winding 16 may be traced from a starting winding terminal 26 through lead 16a of winding 16, conductor 27, protector switch 18, and a common conductor 23 to common terminal 24.

Suitable electric power, such as 115 volts A.C. is furnished to the running windings through terminals 20 and 24, while similar electric power is supplied to the starting winding 16 through terminals 24, 26, and through a starting switch, not shown, of any well known construction, which serves to connect the winding in circuit until the motor attains its running speed, after which winding 16 is disconnected.

The switch means 18 comprises a box-like housing member 30, preferably formed or molded of "Bakelite" or other plastic insulating material, and closed by a cover 31 formed also of insulating material. Housing member 30 is provided with apertured ears or flanges 30a and cover 31 is secured thereto by hollow rivets or eyelets 30b as shown. Switch 18 is conveniently secured to the motor frame member 11a, over an opening 11d therein, by screws 30c extending through eyelets 30b into threaded openings in frame member 11a. Spacers 30d may be interposed between flanges 30a and the motor frame to prevent distortion of the switch housing.

A conductor member 32 extends through, and is secured in an opening 31a in cover member 31, and has its outer end formed into a blade type connector terminal 32a for connection to common conductor 23. The portion of conductor member 32 within the housing is formed into an elongated arm 32b extending substantially parallel to the cover 31. Arm 32b has an offset end portion 32c, to which is secured, as by riveting, one end of a movable contact arm 33. Contact arm 33 carries at its other end a movable contact 33a.

A second conductor member 35 is disposed along the wall of housing member 30 opposite cover 31 and is provided with a relatively stationary contact 35a in registration with contact 33a. Conductor 35 extends through an opening in housing member 30 and terminates in a soldering lug 35b to which conductors 22 and 27 are connected. Contact arm 33 has a central opening therein through which a leg 32d of conductor member 32 extends for cooperation with a bent tongue 33b, which is struck out from arm 33 and has one end engaged in a notch 32e in leg 32d. Tongue 33b acts as a toggle spring and serves to impart a snap action to arm 33 when it is moved, by means described hereinafter, into and out of engagement with contact 35a for making and breaking a circuit therethrough. Thus, when arm 33 is moved to the left as viewed in the drawings, and as it passes through its center position with respect to notch 32e, bowed tongue 33b will act on arm 33 to separate contacts 33a and 35a with a snap movement and to bring the end thereof into engagement with a stop screw 37. Screw 37 is received in a threaded opening in conductor member 32, and has a screw driver slot 37a in the end thereof which is accessible through opening 31b in cover 31 for adjustment of the open position of contact arm 33. Adjustment of screw 37, which screw may be referred to as the differential screw because it serves to adjust the difference between the opening temperature and the closing temperature of the switch, determines the amount of movement of arm 33 required to bring it back through its center position so as to be snapped by tongue 33b to close contacts 33a and 35a.

Contact arm 33, the spring tension of which normally maintains contact 33a in engagement with contact 35a, may be shifted to the left, as viewed in the drawings, to separate the contacts in the snap acting manner described above by thermostatic means secured to housing member 30 and including the previously mentioned tubular element 19, a bellows 40, and a base member 41. The latter has a reduced portion 41a extending through an opening 30e in housing member 30 and through a corresponding opening 35c in conductor member 35. Base member 41 is secured in these openings by staking as at 42 and by a resilient, U-shaped spring clip 44 as shown, and has a cylindrical bore 41b in which the bellows 40 is mounted. A passage 41c, in base member 41, communicates with the interior of the bellows 40 and terminates in an opening 41d. A cup-shaped insulating member 43 is disposed in bore 41b in telescoping relation with base member 41 and surrounding bellows 40. Insulating member 43 provides a connection between bellows 40 and contact arm 33 for effecting movement of the latter in accordance with expansion and contraction of the bellows. A core or plug 40a is disposed inside bellows 40 and serves to reduce the volume of liquid therein so that ambient temperature changes will have a minimum effect on the movement of the bellows.

An adjusting screw 45 extends through a threaded opening 31c in cover 31 and bears against conductor arm 32b adjacent the end thereof. Screw 45 serves to adjustably position arm 32b with respect to insulator member 43 of bellows 40 and hence to determine the distance that contact arm 33 must be moved by bellows 40 to cause it to pass over center so as to snap open contacts 33a and 35a. Inasmuch as the movement of bellows 40 is dependent upon temperature changes, the screw 45 permits the selection of the temperature at which the switch device 18 will open.

Thermostatic tubular element 19 comprises a capillary tube portion 19a, a bulb portion 19b, and a terminal capillary tube portion 19c. Capillary tube 19a is secured as by soldering in opening 41d in base member 41 and in communication with passage 41c thereof. Capillary tube 19c is closed and sealed at its end opposite bulb 19b and is connected by soldering or the like to wire 47 forming part of pole winding 14d. The bellows 40 and tubular element 19 are filled with a suitable liquid, such as glycerine, so that when the temperature of the liquid in the bulb portion reaches approximately 230° F. the bellows will be expanded to a degree sufficient to shift contact arm 33 above the notch 32e and thereby snap open contacts 33a, 35a to break the motor circuit. On cooling of the liquid, it contracts to a point at which the switch contacts 33a, 35a close, due to contraction of the bellows, and which occurs at approximately 190° F. Of course, the adjusting screws 37 and 45 may be utilized to select other operating temperatures, those given being by way of example.

The thermostatic tubular element 19 is formed of an electrically conducting material such as a nickel silver alloy, and is of such wall thickness that the tubular element has substantially the same current carrying characteristics as the wire of the windings, and like the winding wire is coated with a suitable electrical insulating varnish. As was mentioned previously, element 19 actually forms a turn or part of a turn of the current carrying running winding 14d of the motor. To this end the bulb portion 19b is wound or laid in a slot 12b of the laminated pole structure 12a and is preferably completely buried or surrounded by the other conductors or wires forming the adjacent turns of the winding. The capillary tube portion 19a extends from between the turns of wire to the switch 18 while the capillary tube portion 19c extends from between the turns of wire for connection with wire 47 which preferably forms the last wire turn of winding 14d. Thus, the tubular portion 19b, which is supported in the same manner and attitude as the rest of the windings, is in intimate, heat transfer relation with the adjoining wires in the interior of winding 14d and forms an integral, current carrying part of the turns of the winding.

By way of example, the bulb 19b may be formed of the nickel silver alloy known in the art to which the invention pertains as nickel silver "Alloy A," and has an outside diameter of .090 inch, an inside diameter of .063 inch, and is approximately 6 inches long in active length. The heat rise curve of such a bulb, and its enclosed liquid, at 30 amperes of current flow slightly leads the heat rise curve of a #17 copper wire when both are wound into a stator in the manner just described. Therefore, the bulb portion 19b will be subjected to the same increases in temperature as are experienced by the adjacent turns of the winding, not only from heat transfer from the other turns, but also from heating due to internal resistance to the motor current flowing in the winding.

The small inside diameter and consequently the liquid volume of the bulb portion 19b assures that the temperature lag of the body of liquid therein will be extremely small. In addition, the capillary tube portions 19a and 19c, which are exposed to ambient temperatures, have a markedly smaller inside diameter and volume than does the bulb portion 19b, so that temperature changes of the liquid in the capillary tube portions have relatively little effect on the expansion of the bellows as compared with the effect the temperature changes of the liquid in the bulb portion have. Because the capillary tube portion 19a which leads to switch 18 has little effect on the action of the bellows, the switch 18 may be located externally of the housing or at some remote position with the capillary tube extending through the housing wall to lead thereto.

It will be appreciated from the foregoing detailed description of one embodiment of the present invention that there has been provided thereby a motor protection means which is adapted to respond to abnormal increases in temperatures and abnormal current flow in the interior portions of a motor winding, and which protection means is so constructed and arranged that its response is conditioned by a combination of such temperature and current conditions that it will deenergize the motor only when a dangerous temperature condition is approached. More specifically, the operation of the thermally responsive switch means of this invention may be said to accurately reflect temperature conditions in that portion of the motor which is most prone to failure from abnormal conditions, namely the interior portions of the windings. For example in a refrigerating system, when the motor is running under an over-load and the windings 14 are carrying a current which would normally be dangerous to the inner turns thereof, but which turns dissipate sufficient heat to the outer turns which are cooled by the returning refrigerant, the inner turns are in no danger of overheating and the temperature of thermostatic bulb element 19b will be representative of those inner turns and hence the contacts 33a, 35a will not at that time be opened to interrupt the motor circuit. On the other hand, if the temperature of the windings rises gradually to a dangerous degree, although there be a relatively small current flow, the expansion of fluid in the thermostatic element 19 will cause the bellows to open the switch contacts 33a, 35a to stop the motor. Likewise, in the case of a locked rotor where there is an almost instantaneous heavy current flow, the internal resistance of element 19 will cause very rapid heating and expansion of the fluid therein and consequent rapid opening of the motor circuit. Thus, there has been provided by this invention an improved thermostatic protection means which provides a desirable combination of electrical heating effects and of heat transfer effects from other windings, and which, because of the use of a bulb portion in the interior of the windings and smaller capillary tubing leading to the exterior thereof, is not adversely affected by localized cooling such as may occur at the ends of the winding or at the outer turns thereof.

Although the invention has been described with detailed reference to a specific embodiment thereof and in connection with a specific electric motor, it is understood that the invention is not limited thereto, but rather the invention includes all those modifications, adaptations, and uses as are reasonably embraced by the scope of the claims hereof.

Having described my invention, I claim:

1. An electric motor having rotor means and stator means, said stator means comprising: a pole structure having winding slots, a field winding comprising a plurality of turns of a continuous wire having a multiplicity of co-extending closely grouped segments disposed in said winding slots to form a magnetic field for said rotor means, a switch for controlling energization of said winding, an expansible element for operating said switch, one of said winding segments being disposed in said group of segments in said slot and comprising an electrically conductive metallic tubular member one end of which is in communication with said expansible element and the other end of which is closed, said tubular member being in close heat conductive relation with adjacent segments of said group, a thermally expansible fluid contained in said tubular member and expansible element, and means forming an electrical connection with one terminal of said switch and said one end of said tubular member whereby electric current flowing through said winding segments passes in series through said switch and tubular member.

2. An electric motor as defined in claim 1 and wherein said tubular member has substantially the same heat rise characteristics from current flow as the remainder of said wire.

3. An electric motor as defined in claim 1 and wherein said means forming an electrical connection with said one terminal and said one end of said tubular member comprises a conductive support means for said expansible element, said switch comprising normally closed contacts operable by said expansible element, one of said contacts being electrically connected to said conductive support means.

References Cited in the file of this patent

UNITED STATES PATENTS

| | | |
|---|---|---|
| 2,143,085 | Persons et al. | Jan. 10, 1939 |
| 2,369,986 | Schaefer | Feb. 20, 1945 |
| 2,471,840 | Seely | May 31, 1949 |
| 2,712,083 | Armstrong | June 7, 1955 |
| 2,862,093 | Lennox | Nov. 25, 1958 |

FOREIGN PATENTS

| | | |
|---|---|---|
| 1,046,760 | Germany | Dec. 18, 1958 |